US011964560B2

(12) United States Patent
Christmas

(10) Patent No.: US 11,964,560 B2
(45) Date of Patent: Apr. 23, 2024

(54) IMAGE PROJECTOR

(71) Applicant: Envisics Ltd, Milton Keynes (GB)

(72) Inventor: Jamieson Christmas, Milton Keynes (GB)

(73) Assignee: Envisics Ltd, Milton Keynes (GB)

(*) Notice: Subject to any disclaimer, the term of this patent is extended or adjusted under 35 U.S.C. 154(b) by 659 days.

(21) Appl. No.: 17/056,120

(22) PCT Filed: May 14, 2019

(86) PCT No.: PCT/EP2019/062388
§ 371 (c)(1),
(2) Date: Nov. 17, 2020

(87) PCT Pub. No.: WO2019/219711
PCT Pub. Date: Nov. 21, 2019

(65) Prior Publication Data
US 2021/0221224 A1    Jul. 22, 2021

(30) Foreign Application Priority Data

May 17, 2018    (GB) ...................................... 1808023

(51) Int. Cl.
*B60K 35/00*    (2006.01)
*B60K 35/23*    (2024.01)
(Continued)

(52) U.S. Cl.
CPC ............... *B60K 35/00* (2013.01); *G03H 1/08* (2013.01); *G03H 1/16* (2013.01); *G03H 1/2205* (2013.01);
(Continued)

(58) Field of Classification Search
CPC .......... G03H 1/08; G03H 1/16; G03H 1/2205; G03H 1/2294; B60K 2370/1529;
(Continued)

(56) References Cited

U.S. PATENT DOCUMENTS 6,714,327 B1    3/2004    Abersfelder et al.
2002/0167498 A1    11/2002    Eschler
(Continued)

FOREIGN PATENT DOCUMENTS

EP    1006375 A1    6/2000
EP    1544659 A1    6/2005
(Continued)

OTHER PUBLICATIONS

WO03060612 (Year: 2023).*
(Continued)

*Primary Examiner* — Jerry L Brooks
(74) *Attorney, Agent, or Firm* — McDonnell Boehnen Hulbert & Berghoff LLP

(57) ABSTRACT

There is provided ahead-up display in a vehicle arranged to display a picture, the head-up display comprises a first optical sub-system disposed in an upper region of the windscreen and a second optical sub-system disposed underneath the dashboard of the vehicle proximate a lower region of the windscreen. The first optical sub-system is arranged to output a light field. The first optical sub-system comprises a light source and a spatial light modulator. The light source is arranged to emit light. The spatial light modulator is arranged to receive the light from the light source and spatially-modulated the light in accordance with a computer-generated hologram displayed on the spatial light modulator. The second optical sub-system is arranged to receive the light field from the first optical sub-system and project the light field onto a windscreen of the vehicle to form a virtual image on the windscreen.

18 Claims, 11 Drawing Sheets

(51) Int. Cl.
B60K 35/60 (2024.01)
G03H 1/08 (2006.01)
G03H 1/16 (2006.01)
G03H 1/22 (2006.01)

(52) U.S. Cl.
CPC ........... *G03H 1/2294* (2013.01); *B60K 35/23* (2024.01); *B60K 35/60* (2024.01); *B60K 2360/23* (2024.01); *B60K 2360/29* (2024.01); *B60K 2360/333* (2024.01); *B60K 2360/334* (2024.01); *B60K 2360/785* (2024.01)

(58) Field of Classification Search
CPC ............ B60K 2370/29; B60K 2370/23; B60K 2370/333; B60K 2370/334
USPC ......................................................... 359/630
See application file for complete search history.

(56) References Cited

U.S. PATENT DOCUMENTS

| 2012/0002256 | A1 | 1/2012 | Lacoste et al. |
| 2015/0061976 | A1 | 3/2015 | Ferri |
| 2017/0115627 | A1 | 4/2017 | Christmas et al. |
| 2019/0121128 | A1* | 4/2019 | Kasahara ............... B60K 35/00 |

FOREIGN PATENT DOCUMENTS

| EP | 3146377 | A1 | | 3/2017 | |
| GB | 2448132 | A | | 10/2008 | |
| GB | 2461294 | A | | 12/2009 | |
| GB | 2498170 | A | | 7/2013 | |
| GB | 2501112 | A | | 10/2013 | |
| GB | 2552851 | A | | 2/2018 | |
| JP | H07277030 | A | | 10/1995 | |
| JP | 2000238551 | A | * | 9/2000 | |
| JP | 2009184406 | A | | 8/2009 | |
| KR | 20080007772 | A | | 1/2008 | |
| KR | 2011-0117719 | A | | 10/2011 | |
| KR | 2017-0034792 | A | | 3/2017 | |
| WO | WO-03060612 | A1 | * | 7/2003 | ........... G03H 1/2286 |

OTHER PUBLICATIONS

JP2000238551 (Year: 2023).*
UKIPO Combined Search and Examination Report under Sections 17 &18(3), GB Application No. 1808023.4, dated Oct. 31, 2018, 5 pages.
International Search Report and the Written Opinion of the International Searching Authority, PCT Application No. PCT/GB2019/062388, dated Jul. 2, 2019, 13 pages.

* cited by examiner

IMAGE PROJECTOR

CROSS-REFERENCE TO RELATED APPLICATIONS

This application is a U.S. National Stage application of International Patent Application no. PCT/EP2019/062388, filed May 14, 2019, which claims the benefit of priority of United Kingdom Patent Application no. 1808023.4, filed May 17, 2018.

FIELD

The present disclosure relates to a projector and a head-up display. More specifically, the present disclosure relates to a holographic projector and a head-up display for a vehicle such as an automotive vehicle. The present disclosure also relates to a method of holographic projection and a method of projecting a virtual image in a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

Cabin space is at a premium in vehicles, such as automotive vehicles, particularly as more and more advanced driver assistance systems are included. Head-up displays typically consume a relatively large volume, such as 15 litres, of the space underneath the dashboard. There is disclosed a head-up display in which less space underneath the dashboard is used to house components of the head-up display.

SUMMARY

Aspects of the present disclosure are defined in the appended independent claims.

The picture generating unit may comprise a holographic projector in which the picture is a holographic reconstruction of a computer-generated hologram. The picture may be formed on a light receiving surface which acts as a display surface. A HUD based on the holographic projector described in full below is able to deliver a much greater contrast ratio than currently available competing technologies because of the efficiency of the holographic process and its inherent suitability for use with a laser light source.

The head-up display may comprise a holographic processor. The picture may be a holographic reconstruction. The holographic processor may be arranged to output the computer-generated hologram to a spatial light modulator. The computer-generated hologram may be arranged to at least partially compensate for the shape of the windscreen of the vehicle.

The system may be arranged to form the virtual image of the picture using the windscreen by reflecting spatially-modulated light off the windscreen. The light source may be a laser and/or the light of the picture may be laser light. The spatial light modulator may be a liquid crystal on silicon spatial light modulator. The picture may be formed by an interference process of the spatially-modulated light at the light receiving surface. The computer-generated hologram may correspond to a mathematical transformation of the corresponding picture, optionally, a Fourier or Fresnel transformation. The computer-generated hologram may be a Fourier or Fresnel hologram. The computer-generated hologram may be a hologram computer-generated by a point cloud method. The spatial light modulator may be arranged to spatially-modulate the phase of the light from the light source. The spatial light modulator may be arranged to spatially-modulate the amplitude of the light from the light source.

However, some embodiments describe a picture generating unit based on holographic projection by way of example only. The present disclosure is equally applicable to any type of picture generating unit including a backlit liquid crystal display, a laser scanning display, a digital micro-mirror device "DMD", a fluorescent display and a plasma display.

There is provided a head-up display for a vehicle arranged to display a picture, the head-up display comprises a first optical sub-system disposed proximate an upper region of the windscreen and a second optical sub-system disposed proximate a lower region of the windscreen such as underneath the dashboard of the vehicle. The first optical sub-system is arranged to output a light field. The first optical sub-system comprises a light source and a spatial light modulator. The light source is arranged to emit light. The spatial light modulator is arranged to receive the light from the light source and spatially-modulate the light in accordance with a computer-generated hologram displayed on the spatial light modulator. The second optical sub-system is arranged to receive the light field from the first optical sub-system and project the light field towards a windscreen of the vehicle to form a virtual image using the windscreen.

The light field corresponds to the spatially-modulated light. That is, the light field and spatially-modulated light are related and one may be derived from the other. In this respect, it may also be said that the light field is representative of the spatially-modulated light. The light field may be the spatially-modulated light. That is, the wave-front of the light field and the wave-front of the spatially-modulated light may have the same amplitude and phase distribution—although they may be of different size (e.g. the spatially-modulated light may be magnified to form the light field). However, the wave-front of the light field may also be a more complex transform, such as a Fourier or Fresnel transform, of the wave-front of the spatially-modulated light formed by the spatial light modulator. In examples, the spatially-modulated light is representative of the light field in the frequency (or Fourier) domain. For example, the spatially-modulated light may be processed, such as Fourier or Fresnel transformed, in order to form the light field. The Fourier or Fresnel transform may be performed by a software lens integrated into the hologram, as described below. Alternatively, or additionally, the Fourier or Fresnel transform may be performed by a physical optical component such as a correctly-positioned lens.

Conventionally, the components of a head-up display are integrated into a single unit designed to fit in an allocated volume underneath the dashboard. However, head-up display units are relatively large (compared to other electronic systems in a vehicle) because of the large optical throw required to magnify the image on a small display device (typically only a few centimetres) to form an adequately-sized image on the windscreen. The head-up display described herein comprises key components disposed in an upper region of the windscreen (that is, the region proximate the upper part of the windscreen) and key components disposed underneath the dashboard. In particular, the head-up display is broken up into two optical sub-systems which are spatially separated (or displaced). Advantageously, less volume is consumed underneath the dashboard. This is advantageous because the space underneath the dashboard, in particular, is at a premium especially as vehicles become more advanced and the demand rises for HUDs with higher fields of view.

The optical path from the first optical sub-system to the second optical sub-system may be substantially parallel with the general plane of the windscreen. The optical path from the first optical sub-system to the second optical sub-system may also be proximate the surface of the windscreen such as within 30 cms—for example, 20 or 10 cms—of the general plane of the windscreen.

The first optical sub-system may be a picture generating unit which outputs a picture. In these cases, the light field is the picture and the virtual image is a virtual image of the picture. In this configuration, the first optical sub-system is responsible for the picture generation aspects and the second optical sub-system is responsible for the projection aspects. Accordingly, the system is conveniently modular and sub-systems may be individually tuned or changed as required—e.g. for different vehicles or to provide different specifications.

The spatially-modulated light may form the picture on a light-receiving surface of the first optical sub-system. The light-receiving surface can be used to provide additional functionality such as speckle reduction or eye-box expansion.

The spatially-modulated light may form the picture in free space between the spatial light modulator and second optical sub-system. The absence of a light-receiving surface reduces component count and can reduce optical losses.

The first optical sub-system may project the spatially-modulated light encoded with the hologram data. In these cases, the output of the first optical sub-system is a light field corresponding/related to the picture but is not the picture itself. The light field may be a Fourier transform of the picture. In these cases, the light field is the spatially-modulated light.

The eye lens of the viewer may perform an optical Fourier transform of the spatially-modulated light. Advantageously, because the focal length of the human eye is adaptable, holographic images may be made to appear at different distances from the viewer. That is, the position of the replay plane may be dynamically changed. Accordingly, a multi-plane such as dual plane head-up display is provided. Alternatively, the second optical sub-system may be arranged to perform an optical Fourier transform of the spatially-modulated light. The first optical sub-system may be disposed: on the vehicle roof; within the internal roof liner; on the rear-view mirror housing; on a roofline electronics panel; or on the sun visors. Accordingly, key components are disposed in areas of the vehicle having lower real-estate value than underneath the dashboard.

The second optical sub-system may comprise at least one reflective element such as a mirror. This enables a space-efficient optical system to be formed—e.g. using a folded optical path—and provides an optical surface which can be used for optically processing the image. The at least one reflective element of the second optical sub-system may have optical power. This feature delivers the necessary image magnification. The at least one reflective element of the second optical sub-system may be a freeform optic or may comprise a freeform optical surface arranged to at least partially compensate for the shape of the windscreen in the area of the windscreen which receives light of the picture. This provides improved image quality. The at least one reflective element may comprise a laser-line selective filter arranged to allow propagation of light of the picture through the head-up display and supress the propagation of light of having a different wavelength through the head-up display. This significantly reduces the amount of sunlight passing back through the system and mitigates the problems associated therewith—such as optical wash-out of the image or thermal damage optical components such as the spatial light modulator. Alternatively, or additionally, the at least one reflective element of the second optical sub-system may further comprise a polariser, such as a polarising film or coating thereon, arranged to allow propagation of light of the picture through the head-up display and supress, such as attenuate or block, the propagation of light having the orthogonal polarisation through the head-up display. Again, this leads to a reduction in sunlight passing back through the system.

The first optical sub-system may be substantially planar and comprise a substantially planar waveguide arranged to guide light from the light source to the spatial light modulator and guide spatially-modulated light from the spatial light modulator to an output of the waveguide along a continuous optical path. There is therefore provided a substantially planar configuration which is adaptable and has a suitable form-factor for attaching to the roof or fitting within the internal roof-liner structure thereby minimising any impact on the cabin space. The continuous optical path within the waveguide may traverse the longitudinal axis of the waveguide plural time by total internal reflection at the surface of the waveguide.

The first optical sub-system may comprise at least one reflective element such as a mirror. Accordingly, an adjustable (e.g. twist/tilt) component is provided which may be used to maintain optical alignment. Furthermore, additional design flexibility is provided. The at least one reflective element of the first optical sub-system may have optical power. Accordingly, the demand placed on the second optical sub-system—such as the demand to provide optical power—may be relaxed. The at least one reflective element of the first optical sub-system may be a freeform optic or may comprise a freeform optical surface arranged to at least partially compensate for the shape of the windscreen in the area of the windscreen which receives light of the picture. The at least one reflective element may comprise a laser-line selective filter arranged to allow propagation of light of the picture through the head-up display and supress the propagation of light of having a different wavelength through the head-up display. Alternatively, or additionally, the at least one reflective element of the first optical sub-system may further comprise a polariser, such as a polarising film or coating thereon, arranged to allow propagation of light of the picture through the head-up display and supress, such as attenuate or block, the propagation of light having the orthogonal polarisation through the head-up display.

There is provided a head-up display system in a vehicle, the system comprising: a first optical sub-system comprising a picture generating unit arranged to output a light field; and a second optical sub-system arranged to receive the light field from the first optical sub-system and project the light field onto a windscreen of the vehicle to form a virtual image on the windscreen, wherein the first optical sub-system is disposed in an upper region of the windscreen and the second optical sub-system is disposed within the dashboard of the vehicle proximate a lower region of the windscreen.

There is provided a head-up display in a vehicle arranged to display a picture, the head-up display comprising: a first optical sub-system arranged to output a holographic light field, wherein the first optical sub-system comprises: a light source arranged to emit light; a spatial light modulator arranged to receive the light from the light source and spatially-modulate the light in accordance with a computer-generated hologram represented on the spatial light modulator to form the holographic light field, wherein the holographic light field is a frequency domain representation of the picture; and a holographic processor arranged to output the computer-generated hologram to the spatial light modulator; and a second optical sub-system arranged to receive the holographic light field from the first optical sub-system and project the holographic light field onto a windscreen of the vehicle to form a virtual image on the windscreen, wherein the first optical sub-system is disposed in an upper region of the windscreen and the second optical sub-system is disposed within the dashboard of the vehicle proximate a lower region of the windscreen. A holographic light field is a light field having a wave-front spatially-modulated in accordance with the hologram displayed on the spatial light modulator.

There is provided a head-up display in a vehicle arranged to display a picture, the head-up display comprising: a first optical sub-system arranged to output the picture, wherein the first optical sub-system comprises: a light source arranged to emit light; a spatial light modulator arranged to receive the light from the light source and output spatially-modulated light forming the picture in accordance with a computer-generated hologram represented on the spatial light modulator; and a holographic processor arranged to output the computer-generated hologram to the spatial light modulator; and a second optical sub-system arranged to receive light of the picture from the first optical sub-system and project the light of the picture onto a windscreen of the vehicle to form a virtual image of the picture on the windscreen, wherein the first optical sub-system is disposed in an upper region of the windscreen and the second optical sub-system is disposed within the dashboard of the vehicle proximate a lower region of the windscreen.

The term "light of the picture" is used herein to refer to the light which forms the picture. The "light of the picture" may be monochromatic or polychromatic. The "light of the picture" may be composite colour. For example, the "light of the picture" may comprise red, green and blue light. The "light of the picture" may be polarised.

The reader will be familiar with the position of the dashboard in a vehicle during normal use. The second optical sub-system in accordance with this disclosure is described as being disposed "underneath" the dashboard of the vehicle. This terminology is used to reflect that the second optical sub-system is below the surface of the dashboard. More specifically, the entire volume of the second optical sub-system, including the upper most part thereof, is positioned below the surface of the dashboard of the vehicle when in normal use. For example, the second optical sub-system may be disposed within the dashboard or inside the dashboard. The outer most top surface behind the instrument cluster and in front of the windscreen is sometimes referred to as the A-surface or "topper". It may therefore be said that the second optical subs-system is underneath the A-surface of topper.

In accordance with this disclosure a "laser-line selective filter" allows laser-line light to propagate on the optical path described but does not allow non laser-line light to propagate any further on the optical path. In other words, the "laser-line selective filter" removes non laser-line light from the optical system. For example, the "laser-line selective filter" may absorb non laser-line light. For example, a "laser-line selective filter" may be absorb all optical wavelengths except light having the laser-line wavelength. Alternatively, the filter may achieve this selective functionality by being preferentially transmissive or preferentially reflective, for example, to the laser-line light. Likewise, a "polarisation-selective filter" in accordance with this disclosure refers to a filter which removes light having the non-preferential polarisation from the optical system. The term "laser-line" is used to refer to a narrow bandwidth having a centre wavelength and a full-wave half-maximum of less than 30 nm, optionally less than 15 nm, further optionally less than 5 nm.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
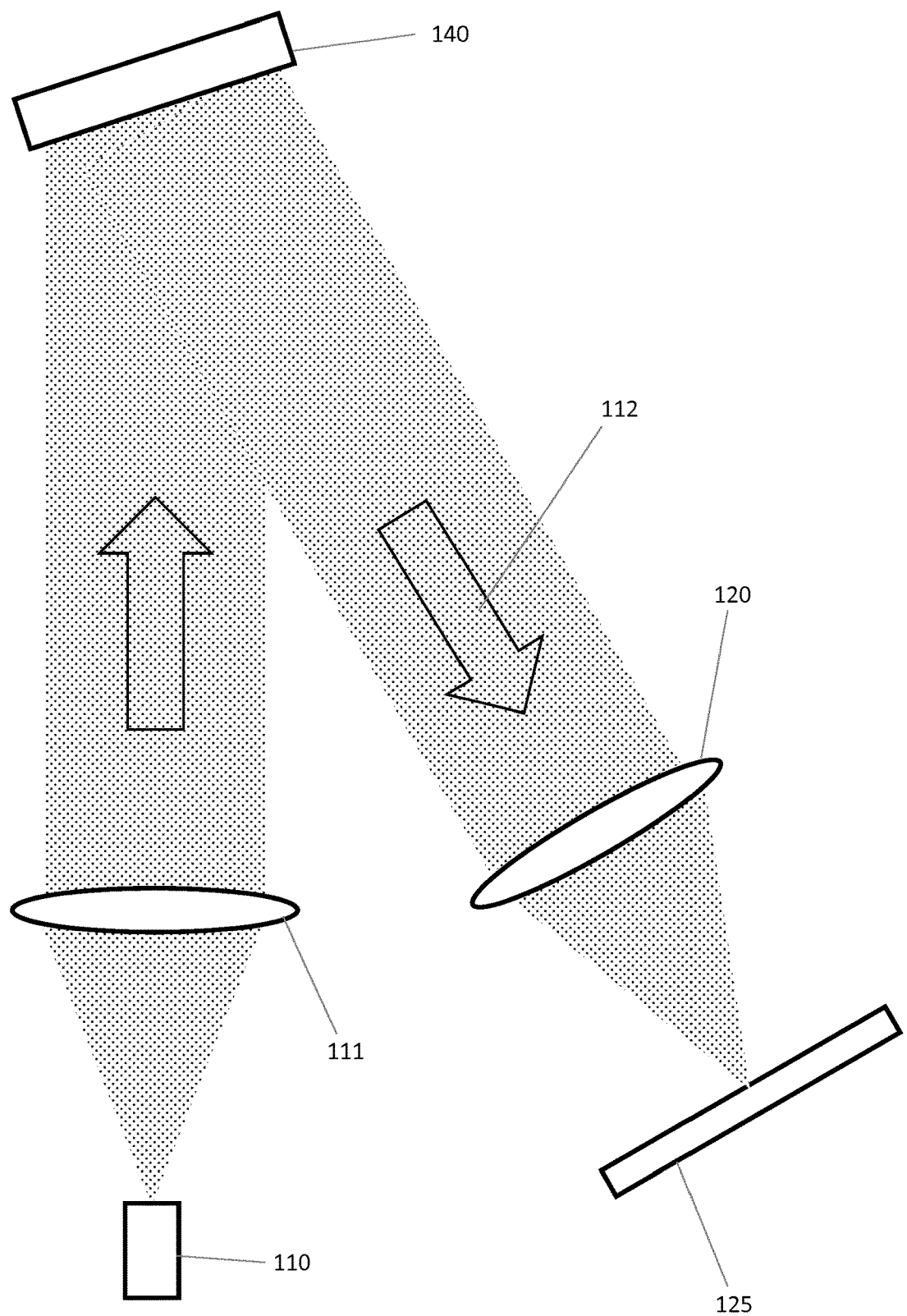
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wave-front of light to be incident on the SLM. In FIG. 1, the direction of the wave-front is off-normal (e.g. two or three degrees away from being truly orthogonal to the plane of the transparent layer). However, in other embodiments, the generally planar wave-front is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wave-front 112. The exit wave-front 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
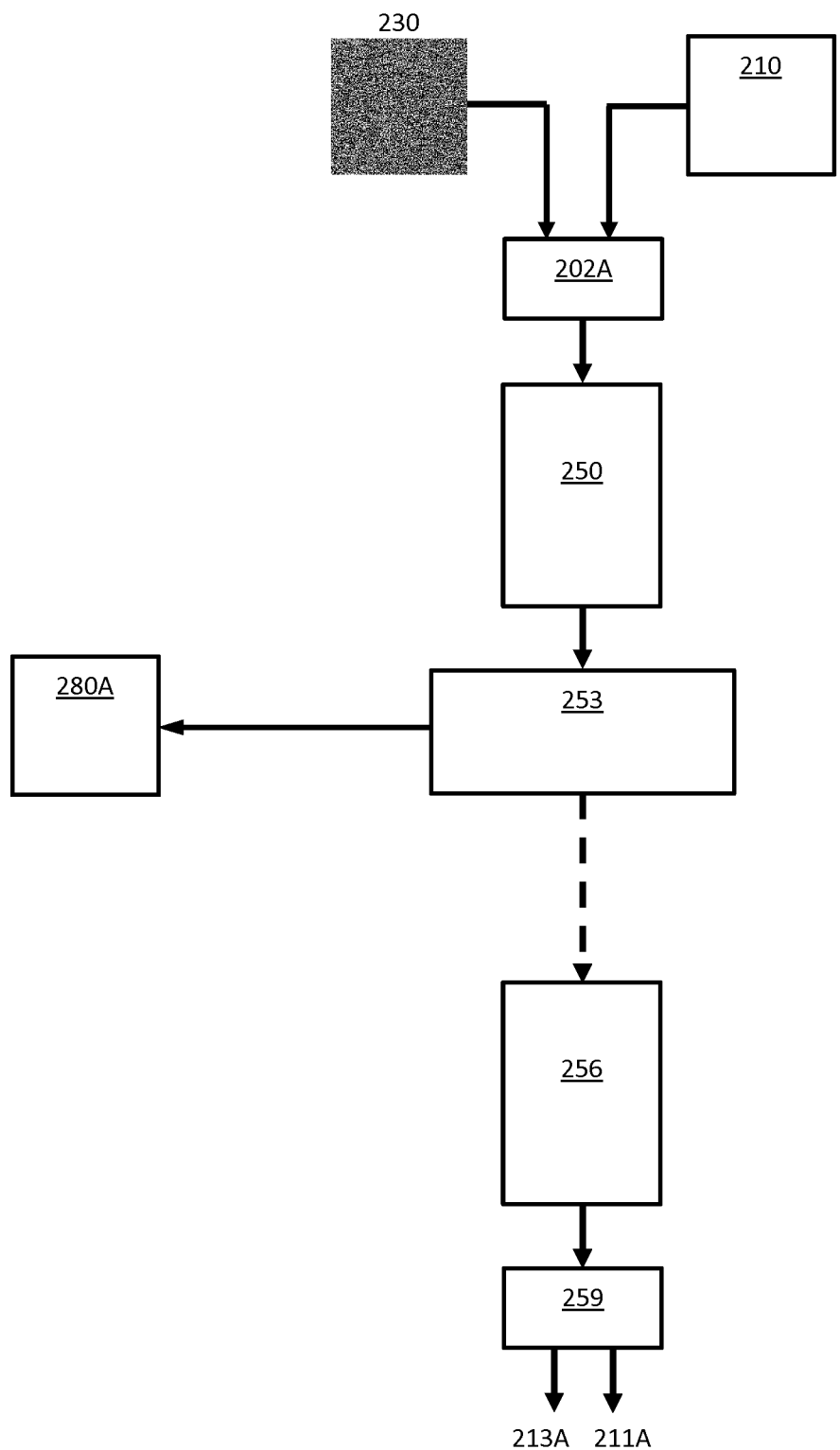
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
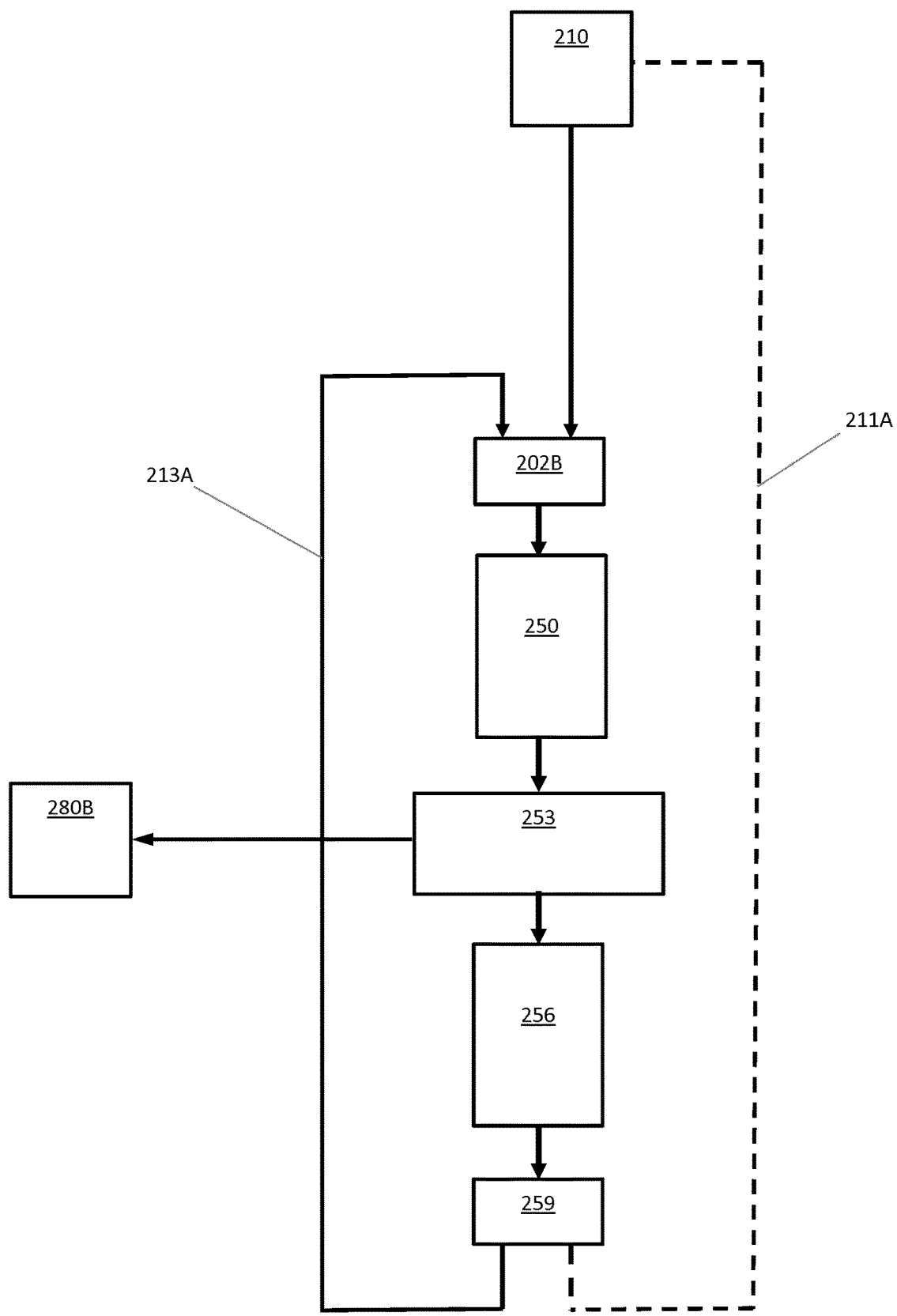
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
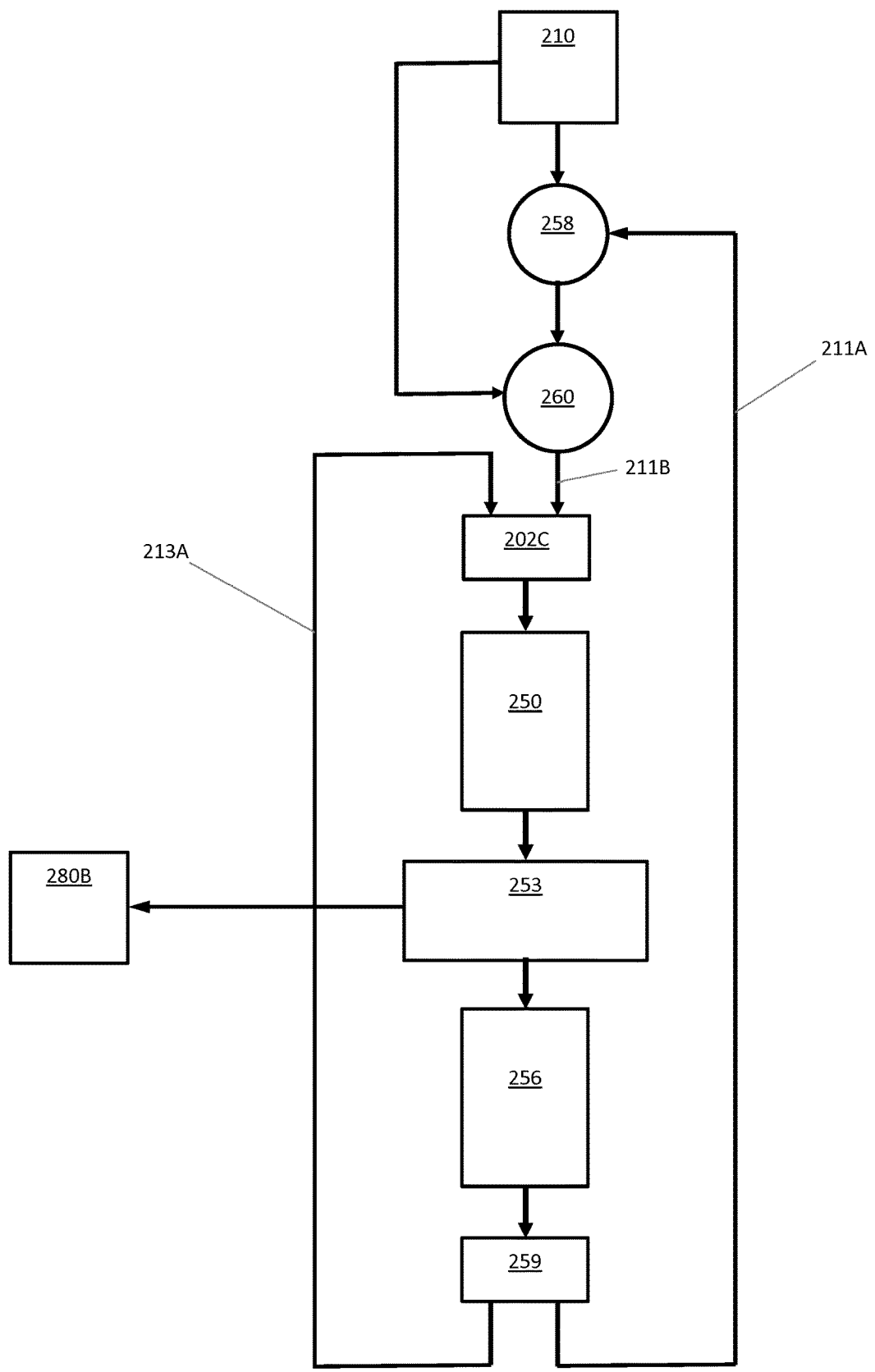
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
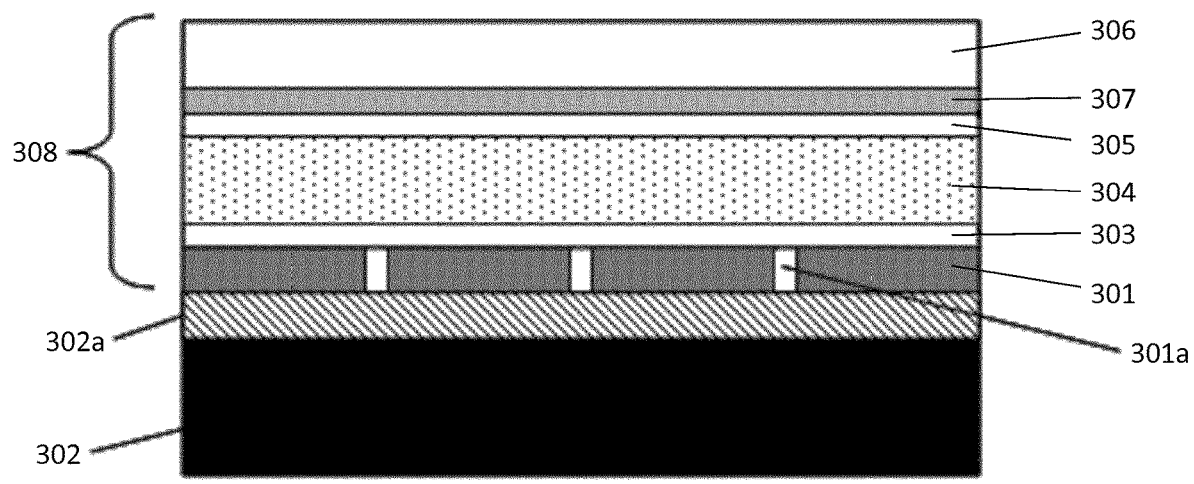
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wave-front, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display

Figure 4:
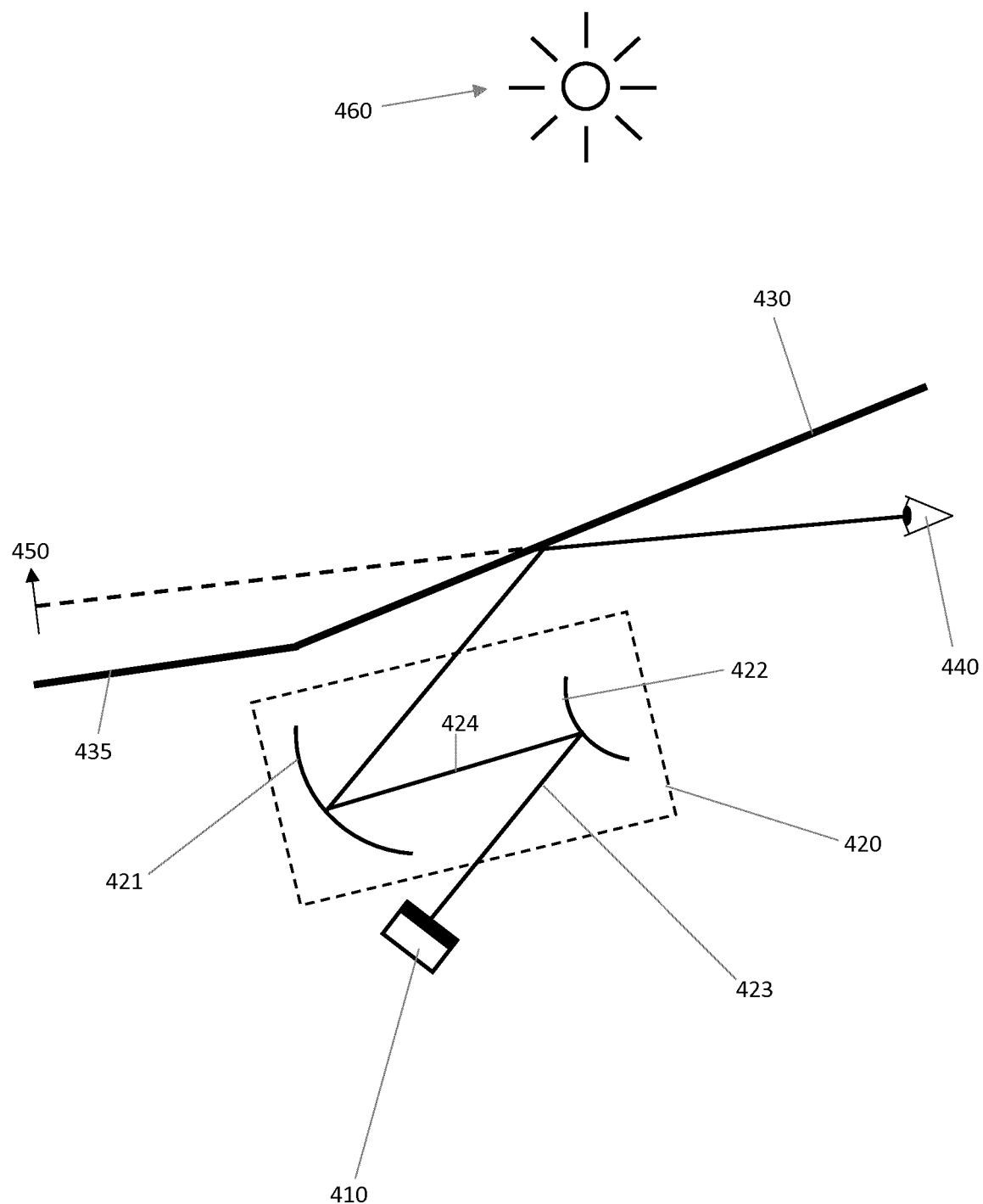
FIG. 4 shows an example HUD in a vehicle.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420.

In this example, the PGU 410 comprises a light source, a light receiving surface and a processor (or computer) arranged to computer-control the image content of the picture. The PGU 410 is arranged to generate a picture, or sequence of pictures, on a light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output in order to increase the optical path length without overly increasing the physical size of the HUD.

The picture formed on the light receiving surface of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors together allow for suitable magnification of the virtual image of the picture.

In embodiments, the PGU 410 comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

Embodiments are described below with reference to FIGS. 5 to 9. These figures show only the interior/internal walls of the windscreen, bonnet and roof of the vehicle. For the avoidance of any doubt, the first optical sub-system and second optical sub-system are disposed inside the vehicle—that is, within the external walls of the vehicle.

Figure 5:
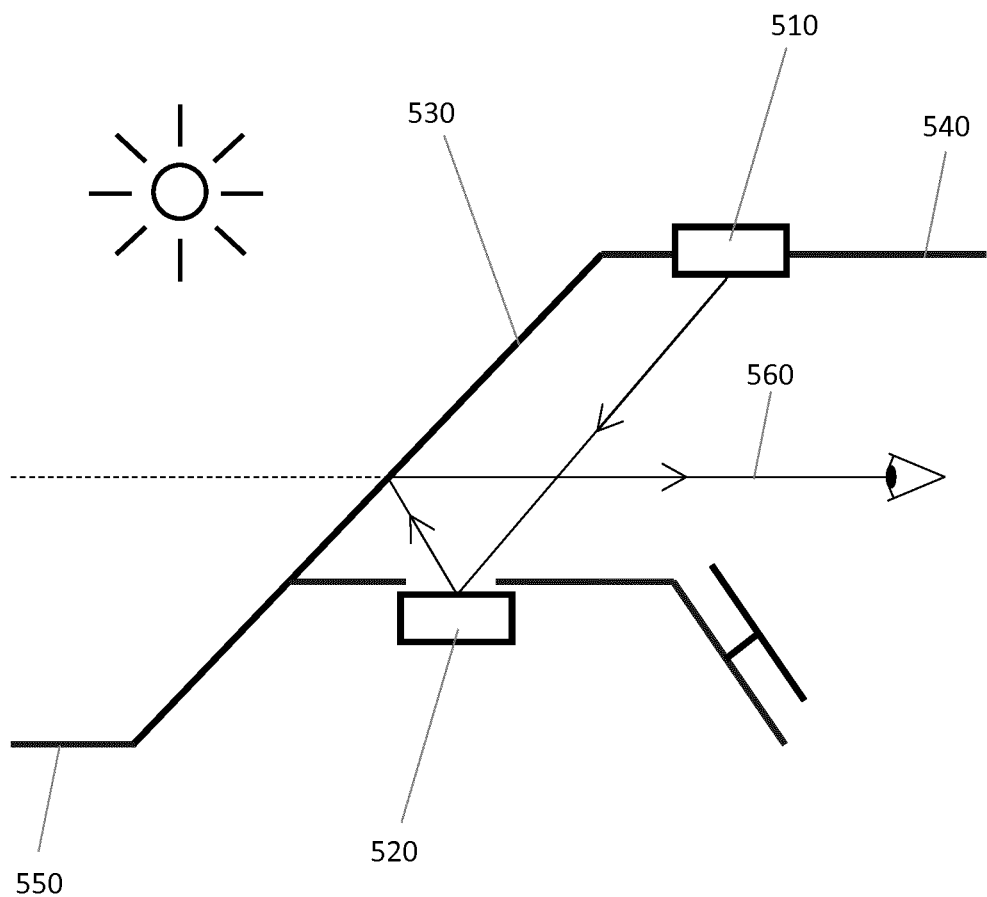
FIG. 5 is representative of a first group of embodiments.

FIG. 5 represents a first group of embodiments. There is shown an optical path 560 from the first optical sub-system to the viewer. Specifically, FIG. 5 shows a vehicle having a windscreen 530, bonnet 550 and roof 540. FIG. 5 also shows a first optical sub-system 510 directly or indirectly fixed or mounted to the roof of the vehicle, such as within the roof liner of the vehicle cabin, and second optical sub-system 520 mounted underneath the dashboard. The first optical sub-system 510 and second optical sub-system 520 cooperate to form a HUD for a viewer such as the driver of the vehicle.

In operation, the first optical sub-system 510 is arranged to display a picture and the second optical sub-system 520 is arranged to receive light of the picture from the first optical sub-system 510 and project the received light of the picture onto the windscreen 530. For example, the step of projecting the received light of the picture onto the windscreen may comprise redirecting the light of the picture or reflecting the light of the picture. The step of projecting the received light of the picture may also comprise magnifying the picture and/or manipulating the received light field to improve the quality of the virtual image such as by correcting for aberrations or the complex shape of the windscreen. The optical arrangement is such that light of the picture is reflected to the viewer. The light of the picture is incident on the windscreen at substantially Brewster's angle. A virtual image of the picture appears to the viewer a distance down the bonnet of the vehicle as shown by the dotted line in FIG. 5.

Figure 6:
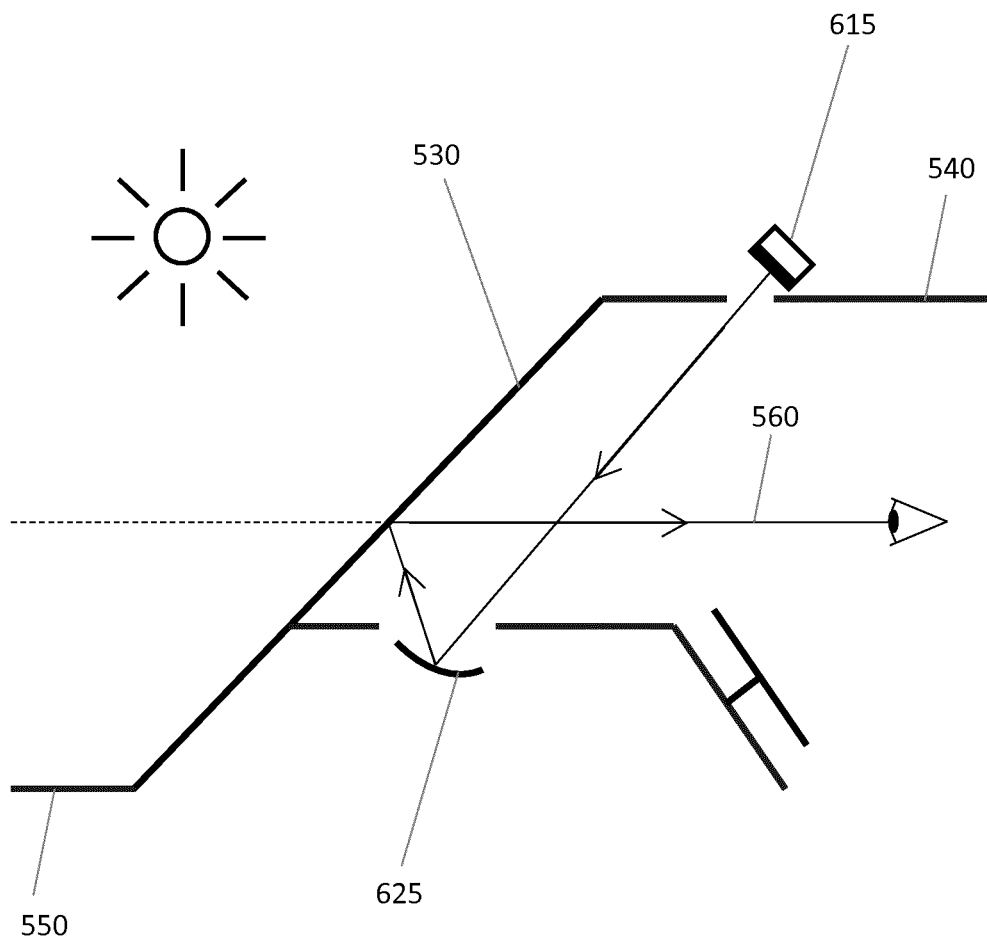
FIG. 6 is representative of a second group of embodiments.

FIG. 6 represents a second group of embodiments. Specifically, FIG. 6 shows a PGU 615 directly or indirectly fixed or mounted to the roof of the vehicle, such as within the roof liner of the vehicle cabin, and a freeform mirror 625 mounted underneath the dashboard. In this embodiment, the first optical sub-system comprises PGU 615 and the second optical sub-system comprises freeform mirror 625. Again, for the avoidance of any doubt, the PGU 615 is not outside the vehicle. The PGU 615 and freeform mirror 625 collectively form a HUD for a viewer such as the driver of the vehicle. It will be understood that, for example, an aperture may be required in each of the roof liner and dashboard to provide a clear/unobstructed optical path from the first optical sub-system to the viewer via the second optical sub-system. In the embodiment shown, the PGU 615 is a holographic projector arranged to form a picture on a light-receiving surface and the picture is a holographic reconstruction of a hologram displayed on a spatial light modulator. However, the PGU may be any type of PGU as previously explained.

In operation, the PGU 615 is arranged to generate a picture and the freeform mirror 625 is arranged to receive light of the picture from the PGU 615 and project the received light of the picture onto the windscreen 530. The step of projecting the received light of the picture comprises reflecting the light of the picture and magnifying the picture. In some embodiments, the step of projecting the received light of the picture further comprises correcting for aberrations and/or the complex shape of the windscreen both of which distort the virtual image.

The freeform mirror 625 is arranged to receive light of the picture from the PGU 615 as an input and output in reflection the received light of the picture to the windscreen 530. The windscreen 530 is arranged to receive the reflected light of the picture from the freeform mirror 625 and reflect light of the picture to the viewer such that the viewer sees a virtual image of the picture in front of them such as a distance down the bonnet.

Optionally, the first optical sub-system may further comprise a mirror on the optical path between the PGU and freeform mirror. The mirror may be arranged to receive light of the picture from the PGU and reflect the received light of the picture to the freeform mirror. The PGU and additional mirror collectively form a first optical sub-system proximate the upper region of the windscreen such as within the roof liner of the vehicle cabin. The freeform mirror receives light of the picture from the mirror of the first optical sub-system and reflects the received light of the picture to the windscreen 530 as previously described.

Figure 7:
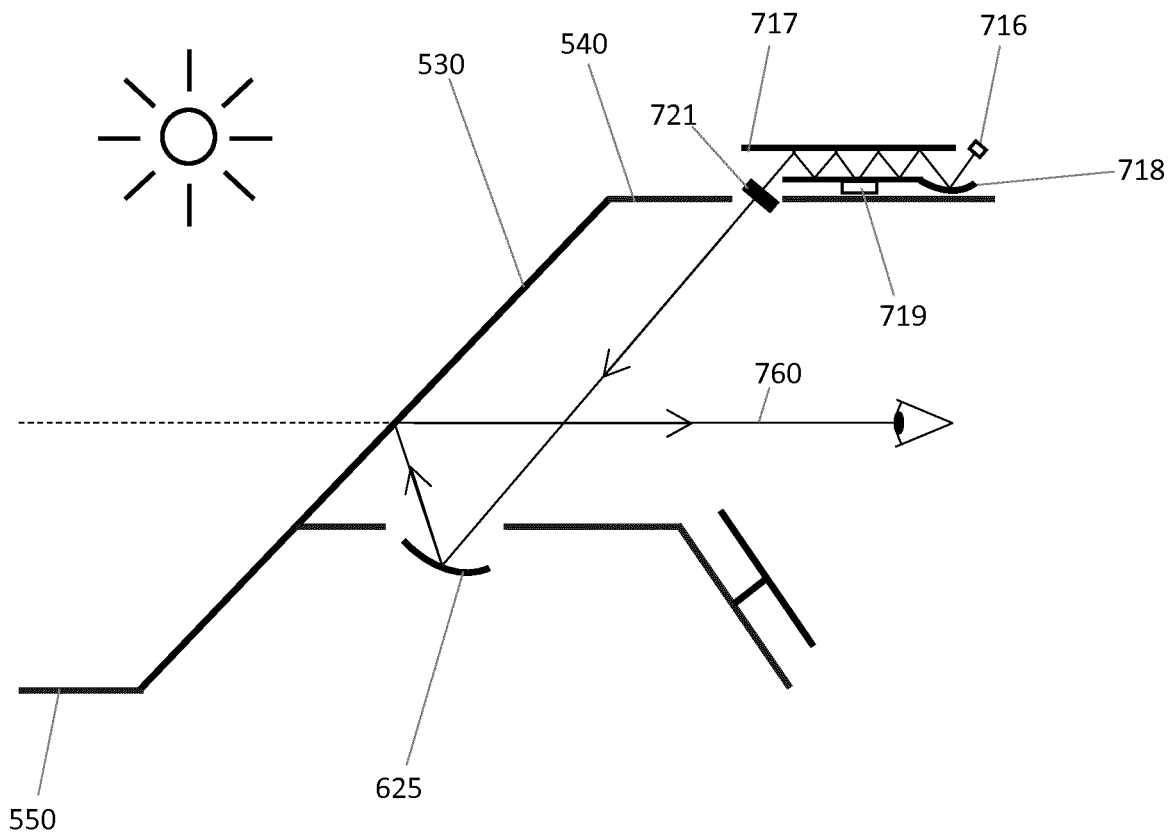
FIG. 7 is representative of a third group of embodiments.

FIG. 7 represents a third group of embodiments. The first optical sub-system comprises a PGU. The PGU comprises a laser diode 716, collimating surface 718, optical waveguide 717, LCOS SLM 719 and light-receiving surface 721 such as a screen or diffuser. The LCOS SLM 719 is arranged to display a hologram in accordance with the present disclosure. The hologram includes a software lens arranged to perform a Fourier transform. The light-receiving surface 721 is positioned at the focal length of the software lens such that a holographic reconstruction corresponding to the displayed hologram is formed thereon. The picture of the PGU is therefore formed on light-receiving surface 721. The components shown in FIG. 7 are not to scale and the first optical sub-system has a thin physical form which allows it to be incorporated into, for example, the roof lining of the vehicle without adding significant bulk—for example, without decreasing the cabin volume. The optical waveguide 717 is configured to guide light from an input to an output using total internal reflection in a manner that will be familiar to the skilled reader. The input to the optical waveguide 717 receives collimated light from a laser diode 716. The collimating surface 718 may be omitted if the laser diode 716 emits collimated light or an alternative collimating element is positioned between the laser diode 716 and LCOS SLM 719. That is, collimating surface 718 is an optional feature. The optical waveguide 717 guides light from the laser diode 716 to the LCOS SLM 719 which spatially modulates the light in accordance with a displayed hologram. The picture is formed on the light-receiving surface 721 and the freeform mirror 625 is arranged to receive light of the picture from the light-receiving surface 721. The freeform mirror 625 reflects the light of the picture onto the windscreen as per the second group of embodiments.

Optionally, an additional optical element providing optical power—such as a lens or shaped surface—may be included between the LCOS SLM 719 and light-receiving surface 721. This optical element may be configured to perform the Fourier transform instead of the software lens. Alternatively, a software lens may be retained and the optical element may be configured to collectively perform the Fourier transform with the software lens. That is, the optical power required to perform the Fourier transform may be divided between the software lens and the additional optical element.

Figure 8:
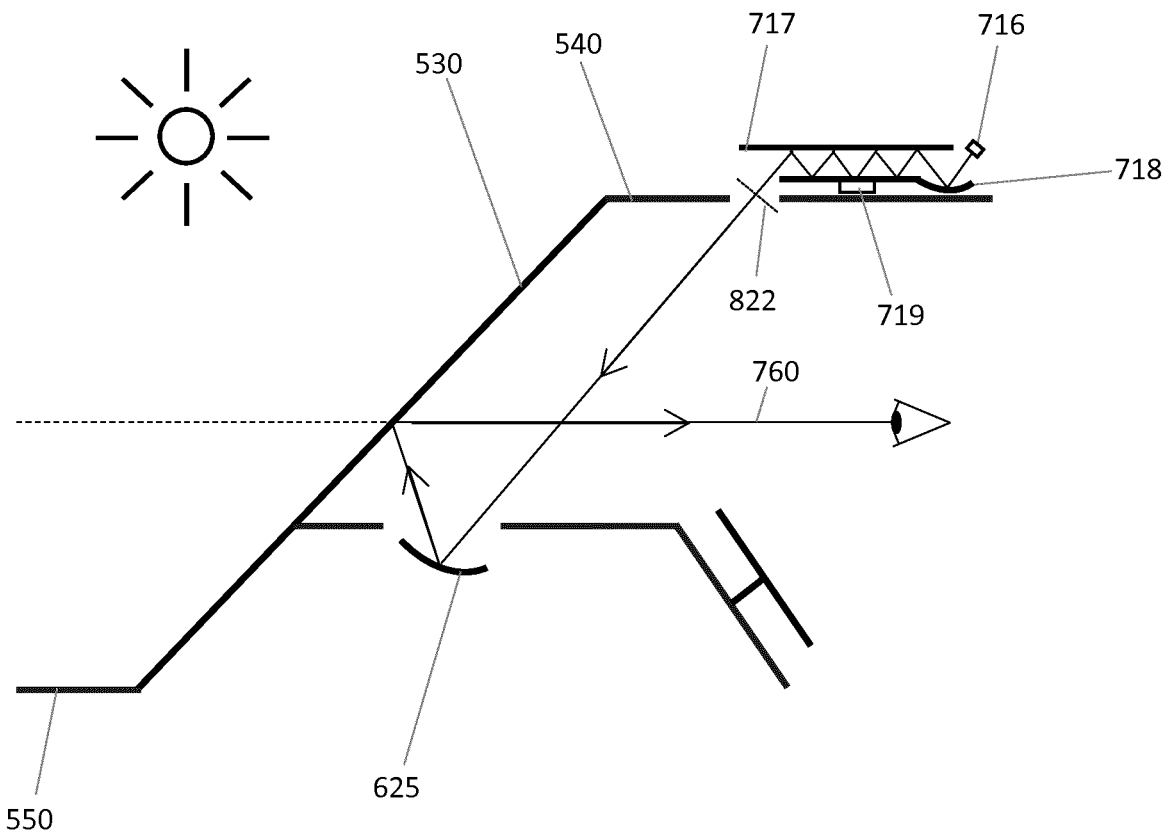
FIG. 8 is representative of a fourth group of embodiments.

FIG. 8 represents a fourth group of embodiments in which the light-receiving surface 721 of FIG. 7 is omitted. In FIG. 8, the holographic reconstruction is formed in free space at replay plane 822. That is, a physical component is not present at replay plane 822. However, the first optical sub-system forms a holographic reconstruction in the same way as previously described. No changes to the second optical sub-system are required to compensate for omission of the light-receiving surface. However, the skilled person will understand that, if the light-receiving surface is diffuse, omission of the light-receiving surface may reduce the size of the so-called eyebox of the HUD system but this can be addressed in other ways outside the scope of the present disclosure.

Alternatively, the (holographic) replay plane may be formed after the second optical sub-system. In this alternative, the optical power of the freeform optic 625 may contribute to the Fourier transform or even provide all of the necessary optical power required for the Fourier transform. Optionally, the replay plane may be coincident with the viewing plane—that is, the plane containing the viewer's eyes.

Figure 9:
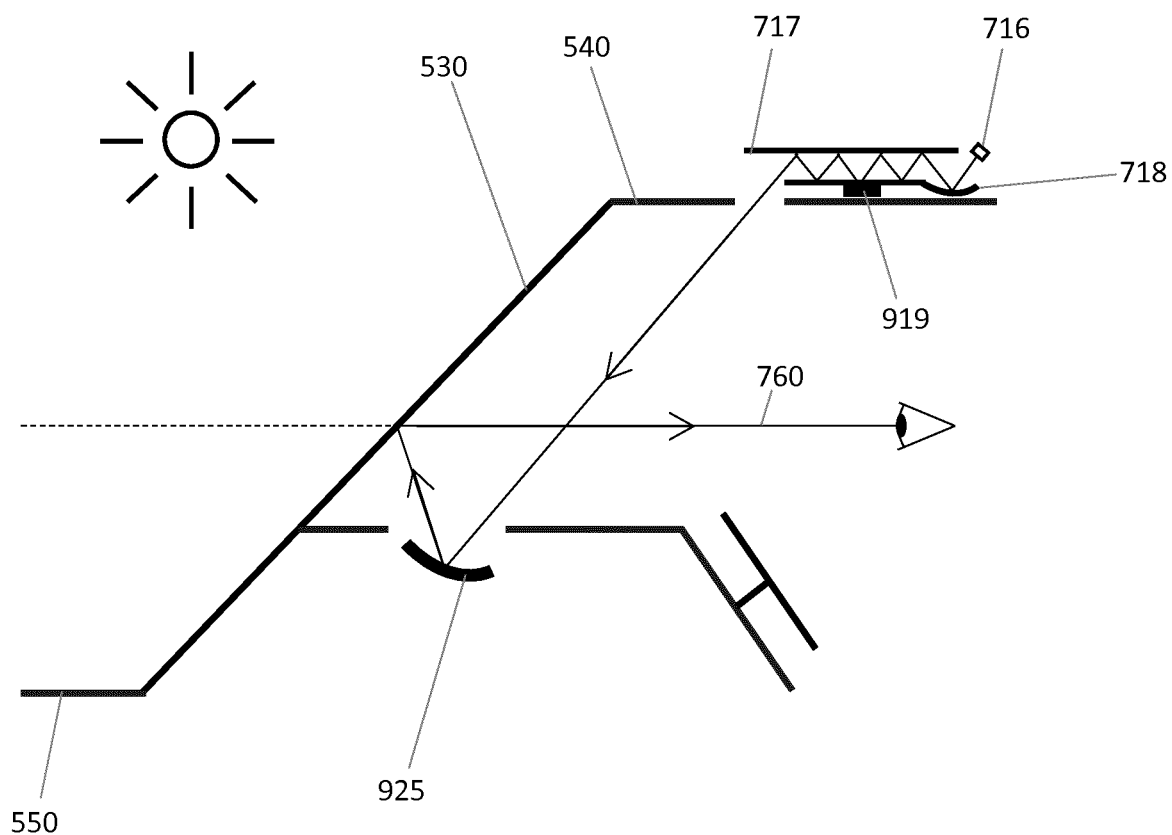
FIG. 9 is representative of a fifth group of embodiments.

FIG. 9 represents a fifth group of embodiments in which the light pattern projected to the viewer is a holographic light field (that is, directly corresponding to the holographic recording) not the holographic reconstruction. FIG. 9 therefore differs from FIG. 8 in that the required Fourier transform is performed by the lens of the eye of the viewer. A holographic reconstruction is not therefore formed in the free space before the viewer. For the avoidance of any doubt, the optical components of the system, including LCOS SLM 919, do not individually or collectively perform a Fourier transform. Effectively, the hologram pattern is projected and the optical power of the lens in the viewer's eye performs the necessary Fourier transform. The second optical sub-system comprises freeform mirror 925 which projects an image of the hologram down the bonnet of the vehicle. In this case, the freeform mirror 925 may magnify the image of the hologram and may optionally correct for optical aberrations in the system or the complex shape of the windscreen.

In any of the described embodiments or groups of embodiments, the second optical sub-system within the dashboard may include a plurality of optical elements such as a plurality of mirrors. For example, the freeform mirror 625/925 may be replaced by a plurality of optical elements—e.g. two or three mirrors—which collectively perform the same functionality as freeform mirror 625/925. In this example, the optical processing—e.g. magnifying, aberration correction etc—performed by the freeform mirror 625/925 may be divided between a plurality of optical elements—e.g. mirrors. The skilled person will understand how any other conventional optics, such as lenses and filters, may be included in the second optical sub-system to provide the HUD described.

In any of the described embodiments or groups of embodiments, the light of the picture may be narrowband (in wavelength) because a laser, such as a laser diode, is used as the light source. At least one of the optical components in the first or second optical sub-system may therefore comprise a wavelength-selective filter, such as a laser-line filter, arranged to allow light of the picture to propagate through the optical system described but attenuate or eliminate light of other wavelengths from the optical system. For example, freeform mirror 625/925 may comprises a reflective laser-line filter arranged to reflect light of the picture but absorb or transmit light of other wavelengths such as light from sun including unwanted infrared and/or ultra-violet light.

Likewise, in any of the described embodiments or groups of embodiments, the light of the picture may be linearly polarised because a polarisation-sensitive device, such as a LCOS device, is used as the spatial light modulator. Therefore, at least one of the optical components in the first or second optical sub-system may comprise a polariser or a polarising film, such as a polarising coating, to attenuate or eliminate stray light of the orthogonal polarisation such as sunlight of the orthogonal polarisation.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser.

In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $^{1}\!/_{75}$th of a second, then the green laser would be fired for $^{1}\!/_{75}$th of a second, and finally the blue laser would be fired for $^{1}\!/_{75}$th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle arranged to display a picture, the head-up display comprising:
   a first optical sub-system arranged to output a spatially-modulated light field, wherein the first optical sub-system comprises:
      a light source arranged to emit light; and
      a spatial light modulator arranged to receive the light from the light source and spatially-modulate the light in accordance with a computer-generated hologram displayed on the spatial light modulator; and
   a second optical sub-system arranged to receive the spatially-modulated light field from the first optical sub-system and to project the spatially-modulated light field onto a windscreen of the vehicle to form a virtual image on the windscreen,
   wherein the first optical sub-system is arranged to be disposed proximate an upper region of the windscreen and the second optical sub-system is arranged to be disposed underneath the dashboard of the vehicle proximate a lower region of the windscreen.

2. A head-up display for a vehicle arranged to display a picture, the head-up display comprising:
   a first optical sub-system arranged to output a spatially-modulated light field, wherein the first optical sub-system comprises:
      a light source arranged to emit light; and
      a spatial light modulator arranged to receive the light from the light source and spatially-modulate the light in accordance with a computer-generated hologram displayed on the spatial light modulator; and
   a second optical sub-system arranged to receive the spatially-modulated light field from the first optical sub-system and to project the spatially-modulated light field onto a windscreen of the vehicle to form a virtual image on the windscreen,
   wherein the first optical sub-system is arranged to be disposed proximate an upper region of the windscreen and the second optical sub-system is arranged to be disposed underneath the dashboard of the vehicle proximate a lower region of the windscreen; and
   wherein the second optical sub-system is arranged to perform an optical Fourier transform of the spatially-modulated light field.

3. A head-up display as claimed in claim 1, the head-up display being arranged for display of the picture to a viewer, arranged such that a lens of an eye of the viewer can perform an optical Fourier transform of the spatially-modulated light field.

4. A head-up display as claimed in claim 2 wherein the virtual image is a virtual image of the picture.

5. A head-up display as claimed in claim 1 wherein the first optical sub-system is disposed: on the vehicle roof; within the internal roof liner; on the rear-view mirror housing; on a roofline electronics panel; or on a sun visor.

6. A head-up display as claimed in claim 1 wherein the second optical sub-system comprises at least one reflective element.

7. A head-up display as claimed in claim 6 wherein the at least one reflective element of the second optical sub-system has optical power.

8. A head-up display as claimed in claim 6 wherein the at least one reflective element of the second optical sub-system comprises a freeform optic or comprises a freeform optical surface arranged to at least partially compensate for the shape of the windscreen in the area of the windscreen which receives light of the picture.

9. A head-up display as claimed in claim 1 wherein the at least one reflective element comprises a laser-line selective filter arranged to allow propagation of light of the picture through the head-up display and suppress the propagation of light of having a different wavelength through the head-up display.

10. A head-up display as claimed in claim 1 wherein the first optical sub-system is substantially planar and comprises a substantially planar waveguide arranged to guide light from the light source to the spatial light modulator and guide spatially-modulated light from the spatial light modulator to an output of the waveguide along a continuous optical path.

11. A head-up display as claimed in claim 1 wherein the first optical sub-system comprises at least one reflective element.

12. A head-up display as claimed in claim 11 wherein the at least one reflective element of the first optical sub-system has optical power.

13. A head-up display as claimed in claim 11 wherein the at least one reflective element of the first optical sub-system comprises a freeform optic or comprises a freeform optical surface arranged to at least partially compensate for the shape of the windscreen in the area of the windscreen which receives light of the picture.

14. A head-up display as claimed in claim 11 wherein the at least one reflective element comprises a laser-line selective filter arranged to allow propagation of light of the picture through the head-up display and suppress the propagation of light of having a different wavelength through the head-up display.

15. A method for displaying a picture using a head up display of a vehicle comprising a windscreen, the method comprising,
   in a first optical sub-system disposed proximate an upper region of the windscreen, emitting light from a light source; and
      receiving the light at a spatial light modulator and spatially-modulating the light in accordance with a computer-generated hologram displayed on the spatial light modulator;
   receiving a spatially-modulated light field from the first optical sub-system at a second optical sub-system disposed underneath the dashboard of the vehicle proximate a lower region of the windscreen; and
   in the second optical sub-system, projecting the spatially-modulated light field onto the windscreen of the vehicle to form a virtual image on the windscreen.

16. A method as claimed in claim 15, wherein the method is for displaying the picture to a viewer, and wherein the projection of the spatially-modulated light field onto the windscreen is performed such that a lens of an eye of the viewer can perform an optical Fourier transform of the spatially-modulated light field.

17. A vehicle comprising a head-up display as claimed in claim 1, wherein the first optical subsystem is disposed proximate an upper region of the windscreen and the second optical sub-system is disposed underneath the dashboard of the vehicle proximate a lower region of the windscreen.

18. A vehicle comprising a head-up display as claimed in claim 2, wherein the first optical subsystem is disposed proximate an upper region of the windscreen and the second optical sub-system is disposed underneath the dashboard of the vehicle proximate a lower region of the windscreen.

* * * * *